United States Patent [19]

Wang

[11] Patent Number: 4,582,611

[45] Date of Patent: Apr. 15, 1986

[54] SOIL DECONTAMINATION WITH WICK DRAINS

[75] Inventor: John J. Wang, Kingwood, Tex.

[73] Assignee: Brian Watt Associates, Inc., Houston, Tex.

[21] Appl. No.: 639,247

[22] Filed: Aug. 9, 1984

[51] Int. Cl.$^4$ .............................................. B01D 35/02
[52] U.S. Cl. ................................... 210/747; 210/805; 210/170
[58] Field of Search ............... 210/634, 638, 639, 691, 210/747, 170, 416.1, 416.3, 805

[56] References Cited

U.S. PATENT DOCUMENTS

| | | | |
|---|---|---|---|
| 629,578 | 7/1899 | Maginn | 210/170 |
| 1,535,112 | 4/1925 | Duke et al. | 210/416.3 |
| 2,953,204 | 9/1960 | Doscher et al. | 210/170 |
| 3,649,533 | 3/1972 | Reijonen et al. | 210/170 |
| 3,722,686 | 3/1973 | Arnett et al. | 210/170 |

OTHER PUBLICATIONS

Hannon, J. B. et al., "Wick Drains, Membrane Reinforcement and Lightweight Fill for Embankment Construction at Dumbarton," Compaction Processes and Properties Symposium at Annual Meeting of the Transportation Research Board, Washington, D.C. (Jan. 1982).
Hansbo, S., "Consolidation of Clay by Band-Shaped Prefabricated Drains," Ground Engineering, pp. 16-25 (Jul. 1979).
Villaume, J. F. et al., "Coal Tar Recovery from a Gravel Aquifer: Stroudsburg, Pennsylvania" (year of publication believed to be 1983).
Alphanumeric Publication Systems, Inc., publications on Groundwater Contamination (Jul. 25, 1983).
Gerahty & Miller, Inc., "The Fundamentals of Ground-Water Quality Protection," Short Course Materials (Oct. 1983).
Lundy, D. A. et al., "Conceptual Designs and Cost Sensitivities of Fluid Recovery Systems for Containment of Plumes of Contaminated Groundwater," Proceedings of the National Conference on Management of Uncontrolled Hazardous Waste Sites, pp. 136-140 (year of publication believed to be 1983).

*Primary Examiner*—John Adee
*Attorney, Agent, or Firm*—Pravel, Gambrell, Hewitt & Kimball

[57] ABSTRACT

A process for removing contaminants from soil or aquifers. The process uses wick drains which include an outer filter medium supported by a rigid inner perforate member. The wick drains are inserted into the contaminated soil or aquifer, water is injected into one or more of the wick drains, and water and contaminants are removed from one or more wick drains. The wick drains are inserted by placing the wick drains in mandrels and driving them into the soil or aquifers, in a manner similar to that in which piles are driven, at a rate of up to about 8,000 to 10,000 linear feet per day.

9 Claims, 9 Drawing Figures

SOIL DECONTAMINATION WITH WICK DRAINS

FIELD OF THE INVENTION

This invention relates to decontamination of soil or aquifers containing hazardous chemicals such as at abandoned chemical dump sites. Particularly, this invention relates to a method for removing hazardous chemicals contained in soil or aquifers by injecting clean water into a first series of wick drains and withdrawing water from a second series of wick drains, wherein decontamination of the hazardous waste site is effected by removing the contaminants with the withdrawn water or by treating the contaminants in situ by adding biological or chemical treatment agents added to the injected water.

BACKGROUND OF THE INVENTION

Hazardous waste site cleanup is a major environmental concern on which significant manpower and resources are expended. Many such hazardous waste sites exist which are an immediate environmental concern. Typically, these hazardous waste sites were created by the dumping of hazardous chemicals in inadequately designed dump pits or sites. The chemicals were deposited in bulk or in leaking or non-corrosion resistant containers. The chemicals at these sites were thus free to seep into the underlying soils and into underlying aquifers. The movement of the contaminants within the soil and aquifers has resulted in enlarging the contaminated area beyond the actual dump site.

One method of decontaminating the hazardous waste sites was to completely remove the contaminated soil by excavation. The removed material was then either treated at a processing facility or transported to another land fill site from which the spread of contaminants was more easily controlled. This method was very expensive and time consuming. Moreover, transporting the contaminated soil from one site to another only postponed the eventual treatment.

Another method for mitigating ground water contamination was the isolation of the hazardous waste site. Clay or synthetic caps were placed over the source of contamination and the plume of contaminants to minimize the infiltration of water from precipitation into the soil. Although the caps had limited downward migration, they had not significantly affected the rate or direction of natural groundwater flow. Caps had also been used in conjunction with slurry wells. In this method, wells were drilled on the perimeter of the contaminant plume and slurry was injected into the subsurface soil. The slurry typically contained bentonite or other materials to reduce soil permeability. However, slurry wells did not completely prevent horizontal movement of contaminants and long term reliability had not been proven. Moreover isolation only delayed detoxification and the waste site remained a potential environmental hazard.

Another attempt at mitigating groundwater contamination has been fluid removal. In fluid removal systems, both drains and wells have been used. Typically, the use of drains involved excavating a pit located toward the downstream end of the contaminant plume. The pit was dug to a depth below the contaminated level and a skimmer was used to collect contaminants from the surface of the water accumulating in the pit. The drain system has been limited in application to shallow plumes in low permeability soils. Since drains were generally exposed to the surface, their application has not been desirable in flood-prone areas. Moreover, removal of contaminants with drain systems has been slow, often requiring many years to reduce the contaminants to an environmentally acceptable concentration.

As an alternative to drains, the drilling of contaminant removal wells provided some flexibility with respect to depth and removal rate. However, the installation of wells was costly and, as with drains located toward the downstream perimeter of the contaminant plume, complete removal of the contaminants could take many years. Accelerated remedial action in which a number of wells were drilled into the source and plume of contaminants hastened the removal of contaminants, but the cost of such systems was extremely high.

More recently, it has been proposed to treat the contaminants in situ using biological or chemical treatment to immobilize or detoxify the contaminants. With this proposal it has been difficult to achieve uniform distribution and mixing of the biological or chemical agents with the contaminants in the subsurface soil. For this proposed method to be effective, wells for injecting the agents must be spaced very closely, and the method has been generally impracticable because of the high cost involved. Thus, all of the methods of the prior art are either ineffective to treat the total contamination problem, or are not practical due to reliability, costs or treatment time involved.

SUMMARY OF THE INVENTION

In contrast to the known methods for removing contaminants from hazardous waste sites, the instant invention provides a method of soil decontamination and cleanup of groundwater which is less expensive, which gives higher reliablity, and which produces the desired results in much less time. The instant invention provides a method for removing hazardous chemicals from contaminated soil or aquifers. The method includes the steps of inserting a plurality of wick drains into the contaminated soil or aquifers and withdrawing water containing the dissolved or entrained contaminants from one or more of the wick drains. Preferably, the process further includes injecting clean water or treatment fluid into one or more of the wick drains.

Insertion of the wick drains is accomplished in a manner similar to that in which piles are driven. The wick drains are relatively inexpensive commodities which can be installed quickly and inexpensively. The low cost and rapid installation permits the wick drains to be installed at very close spacings which is not practical with conventional wells. By closely spacing the wick drains, the contaminated soil or aquifers can be cleaned in much less time because water is actively introduced into the contaminated soil zone. This is particularly true in contaminated soils having a low permeability. The close spacing of the wick drains also lends itself to high reliability in cleanup operations because a very uniform cleaning of soils can be achieved.

In addition, by adding chemical agents to the water injected into the wick drains, the solubility of the contaminants may be enhanced or the viscosity of the contaminant solution may be reduced, thereby further accelerating decontamination. Alternatively, chemical or biological agents may be used to treat the contaminated soil in situ, immobilizing or detoxifying contaminants in the soil or aquifers in place.

DETAILED DESCRIPTION OF THE PREFERRED EMBODIMENTS

Figure 1:
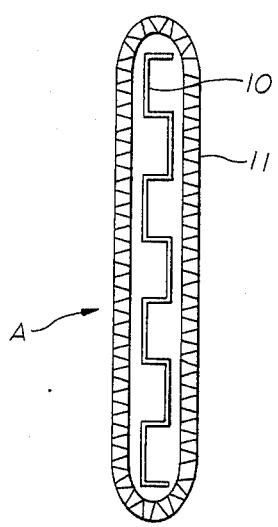
FIG. 1 is a horizontal sectional view of a wick drain which may be used in the method of the present invention.
Figure 2:
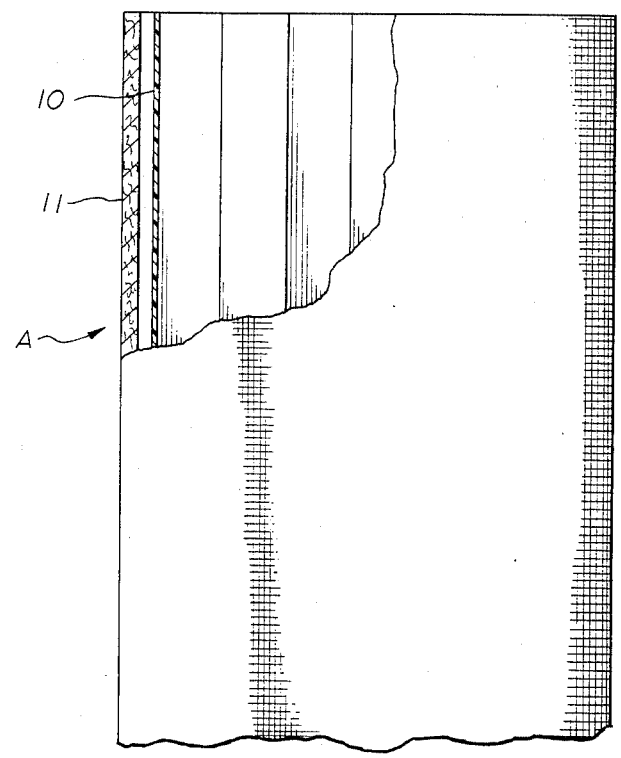
FIG. 2 is a vertical perspective view, partly in section of the wick drain shown in FIG. 1.

Referring now to the drawings, wick drain A suitable for use in the method of the invention is illustrated in FIGS. 1 and 2. Wick drain A includes rigid support member 10 and porous filter medium 11. Support member 10 is corrugated, although other suitable shapes and configurations may be used in the method of the present invention. Preferably, support member 10 is perforated to permit the free flow of water into and within wick drain A. Support member 10 is preferably constructed of an inexpensive, corrosion-resistant material such as polyvinylchloride (PVC) or polyethylene. Porous filter medium 11 permits the passage of fluids but prevents solids such as soil particles from entering the interior of wick drain A and restricting the flow of fluid therein. Preferably, porous filter medium 11 is a geotextile such as polyester.

Figure 4:
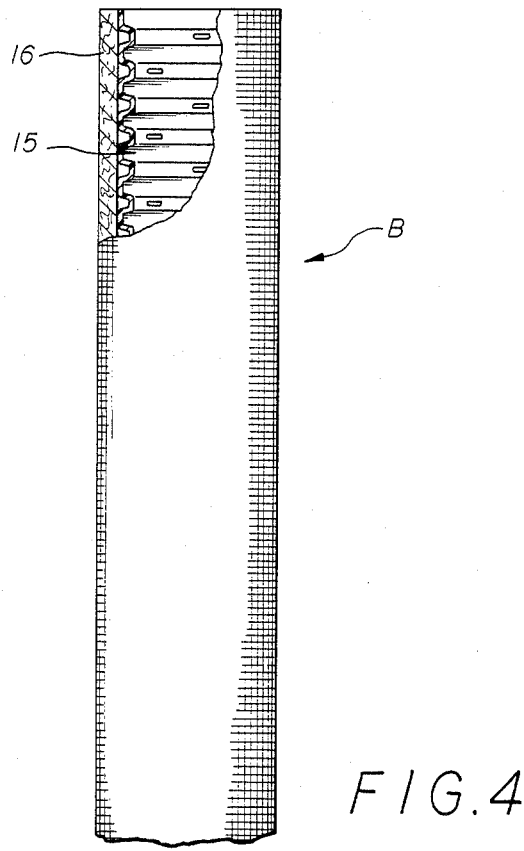
FIG. 4 is a vertical perspective view, partly in section of the wick drain seen in FIG. 3.
Figure 3:
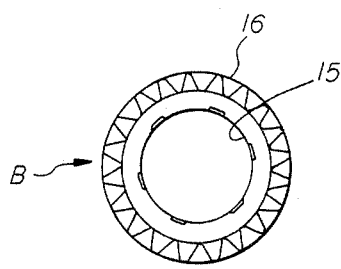
FIG. 3 is a horizontal sectional view of a preferred wick drain for use in the method of the present invention.

An alternative and preferred wick drain is shown in FIGS. 3 and 4. Wick drain B includes rigid support member 15 in the form of a perforated conduit covered with porous filter medium 16. As with wick drain A, the preferred materials of construction of wick drain B are inexpensive materials such as PVC or polyethylene for support member 15 and a geotextile such a polyester for filter medium 16. If desired, support member 15 may be corrugated as shown.

Figure 7C:
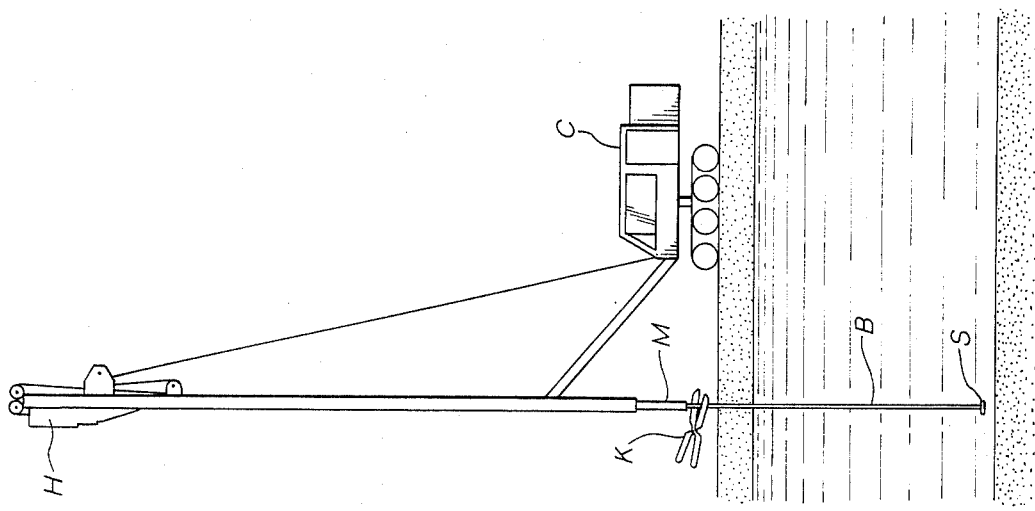
FIGS. 7 a–c are perspective illustrations showing the steps of installing a wick drain with a crawler crane and mandrel assembly according to the present invention.
Figure 7B:
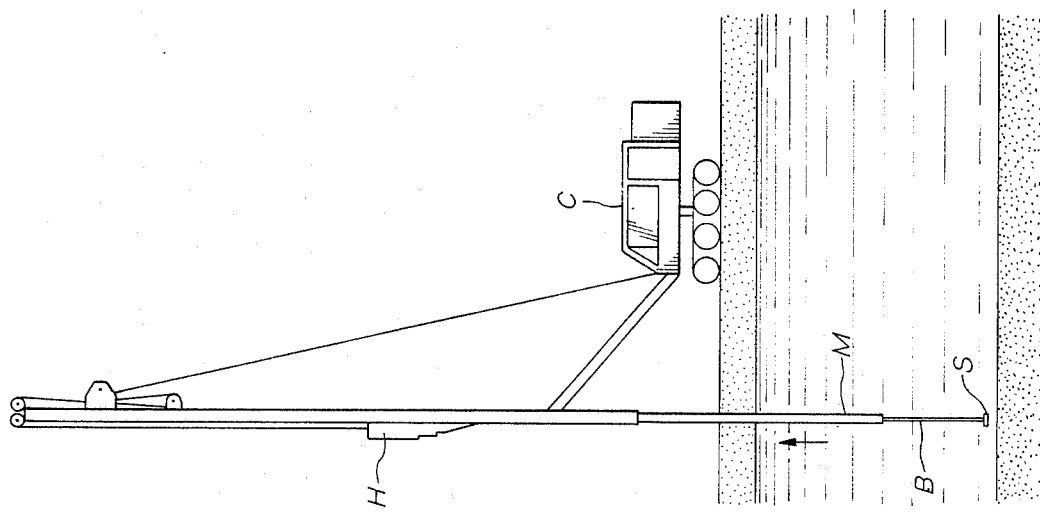
Figure 7A:
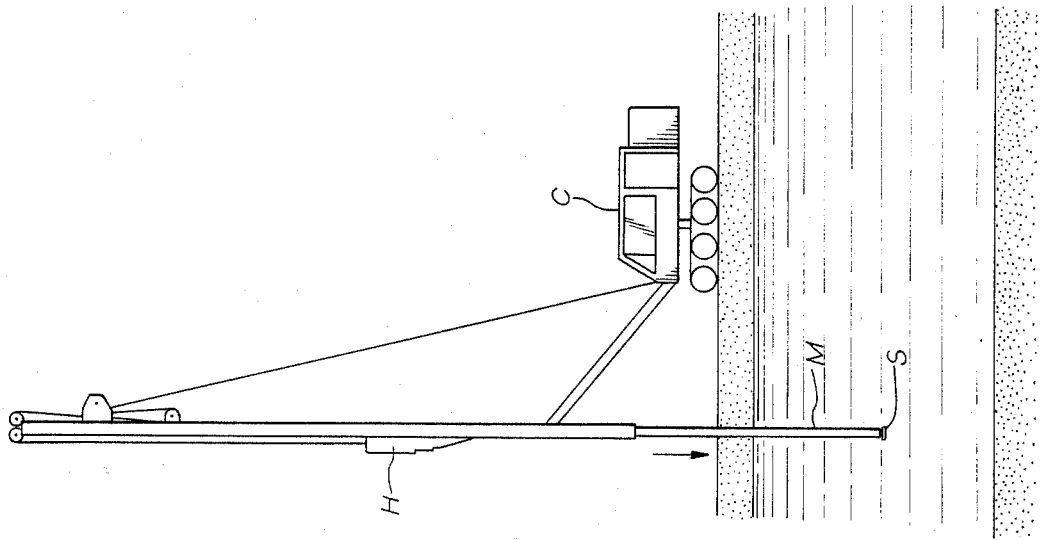

In the method of the present invention, wick drains are inserted into the soil in a well known manner which is here briefly described. Referring now to FIGS. 7 a–c, wick drain B to be inserted is placed in mandrel M and has shoe or anchor plate S attached at its lowermost end. Wick drain B and mandrel assembly M is positioned above the desired location by conventional crawler crane C or other portable driving equipment. As seen in FIG. 7a, mandrel assembly M is then driven vetically into the soil to the desired depth with vibrating hammer H, which may be either an air or steam hammer. Mandrel M is then removed from the soil as shown in FIG. 7b, leaving wick drain B and anchor plate or shoe S in place in the soil. If desired, wick drain B is cut with cutting appliance A as depicted in FIG. 7c so that it is even with the surface, or extends slightly thereabove.

In this manner, wick drains B can be installed at a very high rate, up to about 8,000 to 10,000 linear feet per normal working day per crawler crane, or about three minutes for a fifty foot drain. Thus, the installation of wick drains is ver rapid and economical in comparison to the drilling of wells. As a consequence, with the method of the present invention, it is now practical to install a large number of closely spaced wick drains B throughout a contaminated area. Preferably, the drains are installed at regular intervals throughout the contaminated area. The exact distance of the spacing is determined by taking into consideration such factors as soil porosity and permeability, available water treatment facilities, and the time in which it is desired to complete treatment. Consequently, the preferred spacing of wick drains B may vary from one application to the next.

Figure 5:
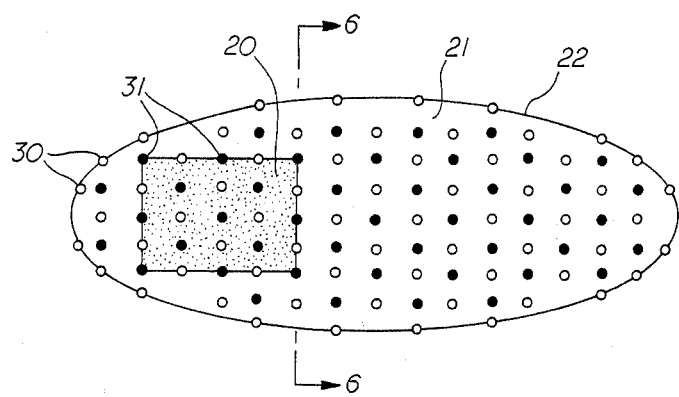
FIG. 5 is a map of a typical waste site showing emplacement of the wick drains according to the method of the present invention.

Typical placement of wick drains B in a hazardous waste site is seen in FIG. 5. Contaminants from contaminant source 20 have spread by the seepage and movement of water in the soil into area 21 bounded by contaminant plume 22. In FIG. 5, emplacement of wick drains B is designated by circles, shaded circles 31 representing wick drains used for injecting water into the soil or aquifers and unshaded circles 30 representing wick drains from which water is recovered from the soil or aquifers. Although other patterns are equally suitable, the pattern of injection and removal wick drains seen in FIG. 5 is preferred.

Preferably, recovery wick drains are located on the perimeter 21 of contaminated area 20 to effect isolation of contaminated area 20 and prevent further spread of the contaminants. It may, in some instances, be desirable to reduce the permeability of the surrounding soil by treating the surrounding soil near the perimeter 21 of contaminated area 20 with a bentonite slurry in the manner known in the art.

Figure 6:
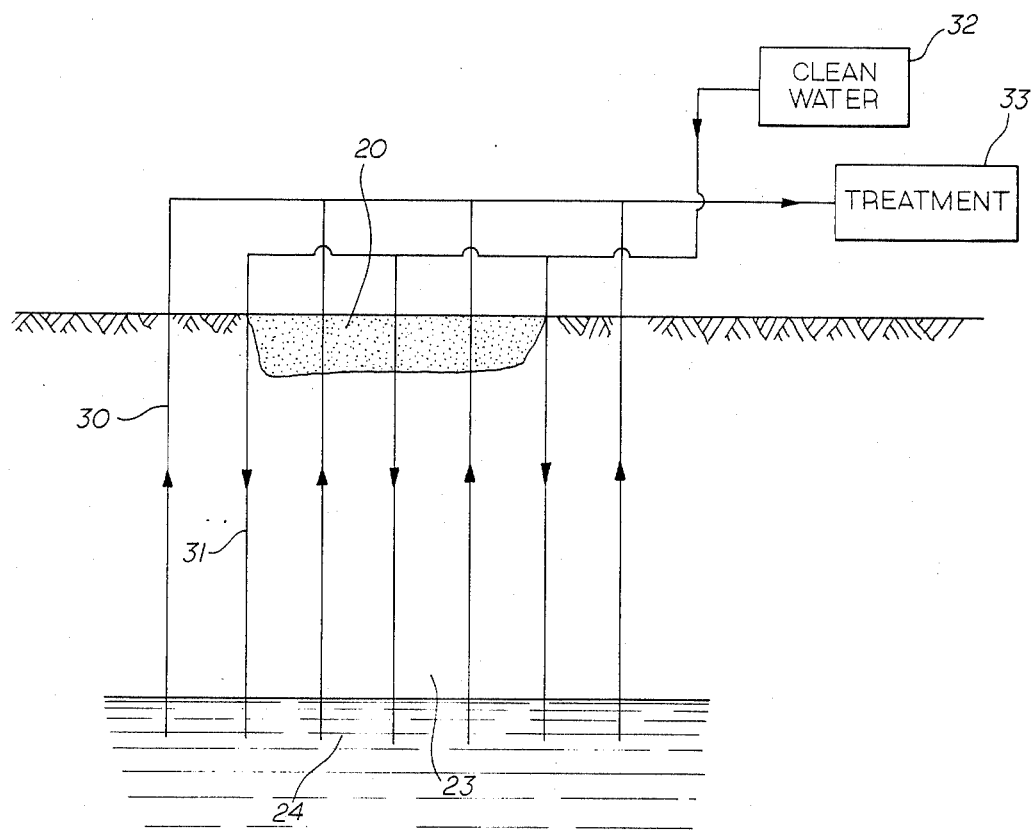
FIG. 6 is a vertical sectional view and schematic of the waste site seen in FIG. 5.

A schematic illustration of the hazardous waste site in FIG. 5 is seen in the vertical sectional drawing of FIG. 6. Uncontaminated water from clean water source 32 is supplied to wick drains 31 and permeates through contaminated soil 23 or aquifer 24, raising the water table, and is recovered from wick drains 30. As the water travels through the contaminated soil, it entrains or dissolves contaminants which are removed with the recovered water from removal wick drains 30 by means of a pipe, tube or hose inserted into the removal wick drains below the water level therein. Recovered water from wick drains 30 is pumped to treatment unit 33 for removal of contaminants or other treatment, before disposal or recycle as the clean water supplied to wick drains 31. As used herein, the term "clean water" refers to water or treatment fluid substantially free of environmentally unacceptable substances.

Permeation of the water through the contaminated soil is caused by a pressure differential maintained between wick drains 31 and wick drains 30. The pressure differential is obtained by controlling the liquid level in wick drains 30 and/or by pressuring the injected water into wick drains 31.

If desired, chemical or biological agents can be added to the clean water supplied to wick drains 31. Chemical agents may be added to enhance the solubility of the contaminants in the water. For example, acid may be added to allow more rapid leaching of metal contaminants, or dispersants added to solubilize organic contaminants. Because of the intimate contact of the injected water with the contaminants in the soil, it is also possible to add agents which treat the contaminants in situ by immobilization or otherwise rendering the contaminants environmentally acceptable. For example, sodium sulfite may be added to reduce water soluble chromium (VI) to water insoluble chromium (III).

The foregoing disclosure and description of the invention are illustrative and explanatory thereof, and various changes in the size, shape and materials, as well as in the details of the illustrated process may be made without departing from the spirit of the invention.

I claim:

1. A method for removing contaminants from soil or aquifers, comprising:
    inserting a plurality of laterally spaced, substantially vertical wick drains into the contaminated soil or aquifer, said insertion comprising placing said wick drains in mandrels, driving said mandrels into the soil or aquifer and removing said mendrels from the soil or aquifer, thereby leaving said wick drains in place in the soil or aquifer, said wick drains comprising an outer filter medium fabric supported by an inner perforate member;
    injecting clean water into one or more of said wick drains; and
    withdrawing water and contaminants from one or more of said wick drains.

2. The method of claim 1 wherein said filter medium fabric is a geotextile fabric.

3. The method of claim 1, further comprising treating said withdrawn water to remove or inactivate said contaminants therein.

4. The method of claim 3, further including the step of injecting said treated, withdrawn water back into the contaminated soil or aquifer for recirculation.

5. The method of claim 1 wherein said clean water contains chemical or biological agents to enhance solubility or soil mobility of the contaminants, or to treat the contaminants in situ.

6. A method for removing contaminants from soil or aquifers, comprising:
    inserting a plurality of laterally spaced, vertically oriented wick drains into the contaminated soil or aquifers, said wick drains comprising an outer filter medium of geotextile fabric supported by an inner perforate member, said insertion comprising placing said wick drains in mandrels, driving said mandrels into said soil or aquifer, and removing said mandrels from said soil or aquifer, thereby leaving said wick drains in place in the soil or aquifer;
    injecting clean water into one or more of said wick drains;
    withdrawing contaminant-containing water from one or more of said wick drains;
    treating said contaminant-containing water to remove contaminants; and
    reinjecting said treated water for recirculation through the contaminated soil or aquifer.

7. The method of claim 6, further comprising the step of sealing the perimeter of the contaminated soil or aquifers with an aqueous bentonite slurry prior to injection of said clean water.

8. The process of claim 6 wherein said wick drains are inserted in a grid pattern of equal lateral spacing.

9. The process of claim 8 wherein a pressure differential is maintained between adjacent wick drains, by using one of said adjacent drains for injection of said clean water and the alternate adjacent drain for withdrawal of said contaminated water.

* * * * *